(12) United States Patent
Kametani et al.

(10) Patent No.: US 6,554,723 B1
(45) Date of Patent: Apr. 29, 2003

(54) GOLF BALL

(75) Inventors: Ryuhei Kametani, Osaka (JP); Susumu Muta, Chichibu (JP); Takashi Ohira, Chichibu (JP)

(73) Assignees: Kametani Sangyo Kabushiki Kaisha, Osaka (JP); Bridgestone Sports Co., Ltd., Tokyo (JP)

( * ) Notice: Subject to any disclaimer, the term of this patent is extended or adjusted under 35 U.S.C. 154(b) by 319 days.

(21) Appl. No.: 09/168,083

(22) Filed: Oct. 8, 1998

(30) Foreign Application Priority Data

Oct. 9, 1997 (JP) ............................................. 9-293402

(51) Int. Cl.$^7$ ............................................. A63B 31/14
(52) U.S. Cl. ....................................................... 473/378
(58) Field of Search ................... 473/237, 378, 473/385

(56) References Cited

U.S. PATENT DOCUMENTS 5,427,378 A * 6/1995 Murphy ....................... 473/385

* cited by examiner

*Primary Examiner*—Mark S. Graham
*Assistant Examiner*—Raeann Gorden
(74) *Attorney, Agent, or Firm*—Sughrue Mion, PLLC

(57) ABSTRACT

A golf ball is provided which bears a mark having a distinct metallic lustered appearance, being superior in durability. The mark is printed by using a transfer printing film having an ink layer containing a pigment and metal particles. An ink composition, defining the ink layer, contains 20 to 35 parts by weight of a metal dispersion relative to 1 to 5 parts by weight of a pigment. The metal particle is in a flattened form and a content of the particles in the dispersion is 5 to 15%. An average thickness of the flattened metal particles is 50 to 500 angstroms and an average diameter 10 to 60 microns. Aluminum, chromium, cobalt, steel, silver, gold or nickel alloy are employed as the metal of the particle.

7 Claims, 1 Drawing Sheet

GOLF BALL

FIELD OF THE INVENTION

The present invention relates to a golf ball having a transfer printed mark superior in luster as well as durability.

BACKGROUND OF THE INVENTION

As a method for marking golf balls, various techniques have been well known including a direct printing technique as typified by a pad printing technique, a transfer printing technique stamping a solid transfer printing film with a die, and a thermal transfer printing technique. The latter uses a transfer printing film having a desired pattern of transfer ink layer on a base film, as disclosed in Japanese Patent Application Kokai No. 63137/1978. Other transfer printing techniques have also been proposed which optimize miscellaneous transfer printing films.

However, every known technique as mentioned above is no more than a technique that in essence employs conventional inks for marking. Therefore, by mixing inks, although it has been successful to some extent to create subtle hues or pastel tones in a mark, such a method has not yet been obtained that can afford a metallic lustered mark which is deemed to be distinct and excellent in appearance.

In general, in order to obtain a transfer printed mark having a metalic luster, a transfer printing film can be used which comprises a metal foil layer therein. However, such film cannot be adapted for the marking of golf balls because the mark transferred from the film may not have sufficient durability considering that a golf ball is an object to be hit repeatedly by a club head weighing over 200 grams with a club head velocity of over 40 meters per second. Thus, the tackiness of the mark to the ball surface is specifically important.

Consequently, an object of the invention is to provide a golf ball bearing a transferred mark which has a distinct and excellent appearance and is superior in durability.

SUMMARY OF THE INVENTION

As a result of earnest studies and investigation to achieve the above object, the inventors found that when metal particles are incorporated in an ink composition together with a pigment, a transferred mark can be formed having an excellent appearance as well as preserving a sufficient durability on a golf ball.

In a preferred mode of the present invention, an ink composition contains 1 to 5 parts by weight of a pigment and 20 to 35 parts by weight of a dispersion of metal particles.

The particle used herein is suitably in a flattened form having an average thickness of 50 to 500 angstroms and an average diameter, i.e. average length or breadth of 10 to 60 microns.

As a metal aluminum, chromium, cobalt, steel, silver, gold and nickel alloy including an alloy of nichrom are specifically contemplated for use in the present invention as the particles. The invention will now be described in detail mainly exemplifying aluminum particles, which finds the most preferable results.

BEST MODE FOR CARRYING OUT THE INVENTION

Figure 1:
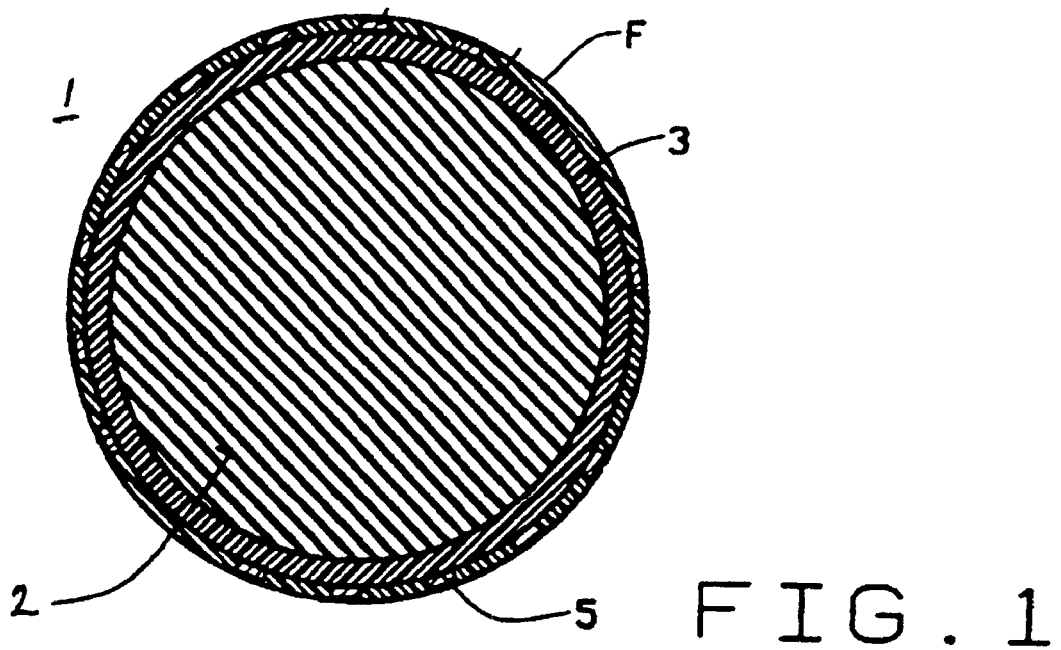
FIG. 1 is a schematic cut-away view of the golf ball of this invention.

The inventors found that the ink prepared by blending a pigment and metal particles such as aluminum particles yields a metallic luster and can realize the transfer printed mark that is possessed with novel tones and appearance and is superior in durability.

In a transfer printing film for use in marking golf balls according to the present invention, there is formed a transfer pattern in reverse with an ink layer containing 20 to 35 parts by weight of an aluminum dispersion relative to 1 to 5 parts by weight of a pigment.

In a preferred mode of the present invention, a content of the aluminum particles in the dispersion to be incorporated in the ink composition, which defines the ink layer, may range preferably between 5 and 15%. This is because such aluminum content as set above offers a viscosity of the dispersion best to handle for formulating the ink. More preferably the content is 8 to 12%.

The solvent usable herein in the aluminum dispersion includes ethyl acetate, monoalkyl ether of ethylene glycol, monoalkyl ether acetate of ethylene glycol, and mixture thereof. If necessary, other solvent such as acetone, toluene, methyl ethyl ketone can be added further.

As described above, it is recommendable to incorporate 20 to 35 parts by weight of the aluminum dispersion having an aluminum content of 5 to 15% and 1 to 5 parts by weight of a pigment in the ink layer.

The ink layer with less than 20 parts by weight of dispersion gives rise to only unsatisfactory metallic luster. When the dispersion content exceeds 35 parts by weight, the metallic luster is not enhanced, hence, the maximum is preferably 35 parts by weight. More preferably the dispersion content is 20 to 30 parts by weight relative to 1 to 5 parts by weight of a pigment.

In a preferred mode of the present invention, a form of the aluminum particle in the dispersion is flat and fine. In particular, it is preferable to use flattened particles having an average thickness of 50 to 500 angstroms and an average diameter of 10 to 60 microns. More preferably the average thickness is 100 to 500 angstroms, and most preferably 250 to 450 angstroms. The metal particles having thickness exceeding 500 angstroms may cause the rough mark surface.

On the other hand, the average diameter of the particles is more preferably 10 to 50 microns, and most preferably 25 to 50 microns. When the average diameter is less than 10 microns, the mark is likely to fail to have a satisfactory metallic luster. When particles having the average diameter exceeding 60 microns are employed, it often becomes difficult to disperse the particles uniformly in the ink layer and it becomes hard to make the mark the surface in a smooth manner.

Aluminum particle employed in the present invention is, as described above, preferably in the flattened form. In this case, the particle may be planar, or otherwise may be embossed. According to the inventors' investigation, it was revealed that use of such a metal particle that has been embossed to have one or two combinations of a concavity and a convexity on the flattened surface thereof results in extremely excellent luster.

In particular, when a mixture composed of particles having different average diameter from each other is used, the transfer mark that is obtained is furnished with an excellent metallic luster, even if the particles are made of the same kind of metal and the dose of the particles is not so high. In a preferred mode of the present invention, the particles, each having one concavity, and the particles, each having two repeating concavites, are mixed in a ratio of 60:40 to 40:60. In other words, the particles having an average diameter ratio of about 1:2 are mixed in a ratio of 60:40 to 40:60.

For the aluminum dispersion, for example, products commercially available from Avery Dennison Corporation under a trade name of "Metalure®" can be preferably used. Dispersions of other metal particles can be prepared, for example, according to the teachings of U.S. Pat. No. 5,624,076.

As described above, examples of metal usable in the despersion in the present invention include chromium, cobalt, steel, silver, gold, nickel alloy, and the like. Mixture of more than two selected from the above is also usable.

As far as a pigment is concerned, any known pigments can be employed which have been used in the conventional transfer printing films for use in marking of golf balls. In particular, clear organic pigments are preferably usable because of their high brightness that enhances luster and improve the effect in ink achieved by incorporating the aluminum dispersion. Examples of such clear organic pigment include isoindolinone as yellow pigment, perylene as red pigment, phthalocyanine blue as blue pigment, and the like.

Transfer printing film as used in the present invention can be produced by applying an ink layer in a desired transfer pattern on a base film with the ink by means of a common gravure printing technique or screen printing technique. The ink is prepared by mixing and diluting a vehicle, a plasticiser, fillers, as well as a pigment and an aluminum dispersion in an adequate solvent. Any known vehicles can be employed which have been generally used in the ink manufacturing. Examples of such vehicle include a vinylchloride-vinylacetate-vinyl alcohol copolymer, a urethane resin, an epoxy resin, a polyesther resin, a polyethyleneimine resin and a mixture thereof. Any of known base films can be employed which have been commonly used in the transfer printing film manufacturing. Examples of such base film include a polypropylene film, a biaxially oriented polypropylene film, a laminate film of a polypropylene film or a biaxially oriented polypropylene film and a glassine.

Preferably a thickness of the ink layer on the base film is regulated so that a thickness of the ink layer when transferred to the golf ball turns to be 1 to 8 microns.

Transfer of the mark to the golf ball can be carried out by positioning the mark in the transfer printing film in a marking portion on the golf ball, followed by pressing the film against the ball under a temperature of ca. 90 to 150° C., or 150 to 180° C., thereafter removing the base film.

Optionally, a clear coat may be applied over the transferred mark.

The mark is applicable to any kind of golf balls including one-piece ball, two-piece ball, multi-piece ball greater than three-piece ball, and thread-wound ball.

EXAMPLE

Examples of the present invention are given below by way of illustration and not by way of limitation. All parts and percentages are by weight unless otherwise indicated.

For making transfer printing films A to D (Examples) and transfer printing films E and F (Comparative Examples), ink compositions were prepared by mixing the components shown in Table 1, wherein aluminum dispersion is not incorporated in the ink compositions for Comparative Examples E and F. On biaxially oriented polypropylene films having a thickness of 20 microns, circles, as transfer pattern, were printed solidly in 10 millimeters diameter and 2 microns thick with each ink composition by means of a screen printing technique or gravure printing technique to obtain the films A to F. For the aluminum dispersion, a product commercially available from Avery Dennison Corporation under a trade name of "Metalure®" L-55350 (aluminum particles 10%, ethylacetate 89% and acetone 1%) was used.

Necessary number of two-piece golf balls 1 were provided, each having a core 2 enclosed in a cover material 3 of 2 millimeters thick. The core 2 was made of cross-linked synthetic rubber including polybutadiene rubber as a main component. The cover material 3, having a Shore D hardness of 65, was made of ionomer resin as a main component. Each ball was plasma treated on the surface.

The pattern of the circle was thermal transferred to the golf ball surface by pressing each film (f) A to F against the ball by a silicone pad for 1 second under 120° C. As Reference Example, a golf ball having a mark in the same form as above pattern was made by stamping an aluminum vacuum evaporation coated film G with a die.

At this stage, it was evaluated by a visual observation whether the mark of the circle was completely transferred to the ball surface. Color tone and a degree of luster in the mark were also evaluated by a visual observation. The results are shown in Table 2, wherein for transferability the symbol "○" stands for excellent and the symbol "Δ" stands for transfer with some portions remained untransferred, and for tone and luster the symbol "○" stands for brilliant and lustered, the symbol "Δ" stands for no luster and the symbol "□" stands for lustered.

On the thus marked golf balls, a two-component reactive clear urethane paint 5 was spray coated, dried, and cured. Thereafter, the resulting golf balls were examined by the following tests to assess durability of the marks.

Impact Test

The ball was hit 200 times repeatedly by #1 wood with a club head velocity of 45 meters per second toward a fabric-made target. A degree of damage on the mark was evaluated by a visual observation according to the following criteria:

○: no damage

Δ: some portions chipped

Sand Abrasion Test

The ball was stirred for 2 hours in a porcelain ball mill with sand used for bunker in a golf course. A degree of wear and tear of the mark and damage on the mark were evaluated by a visual observation according to the following criteria:

○: the same as before test, no wear and tear, no chipping x: some portions worn and chipped Sand/Water Abrasion Test The ball was stirred for 3 hours in a porcelain ball mill with sand used for bunker in a golf course and water in equal amount of the sand. A degree of wear and tear of the mark and damage on the mark were evaluated by a visual observation according to the same criteria as the above sand abrasion test.

The results of these durability tests are shown in Table 2.

TABLE 1

|  | Example | | | | Comparative Example | | |
|---|---|---|---|---|---|---|---|
| Transfer printing film | A | B | C | D | E | F | G |
| Type of printing | Screen | Screen | Gravure | Gravure | Screen | Gravure | — |
| Ink composition | | | | | | | |
| Vinylchloride- vinylacetate - vinylalcohol copolymer | 15 | 20 | 15 | 20 | 15 | 15 | aluminum vacuum evaporation coated film |
| Epoxy resin | 2 | 3 | 2 | 3 | 2 | 2 | |
| Dispersion of aluminum powder | 20 | 30 | 20 | 30 | — | — | |
| Isoindolinone | — | 5 | — | 5 | — | — | |
| Perylene | 1 | — | — | — | 1 | — | |
| Phthalocyanine blue | — | — | 1 | — | — | 1 | |
| Plasticizer | 10 | 15 | 10 | 15 | 10 | 10 | |
| Cyclohexanone | 26 | 14 | — | — | 26 | — | |
| Methyl ethyl ketone | — | — | 26 | 14 | — | 26 | |
| Aromatic solvent of high b.p. | 26 | 13 | — | — | 26 | — | |
| Toluene | — | — | 26 | 13 | — | 26 | |

TABLE 2

|  | Example | | | | Comparative Example | | |
|---|---|---|---|---|---|---|---|
| Transfer printing film | A | B | C | D | E | F | G |
| Appearance | | | | | | | |
| Transferability | ○ | ○ | ○ | ○ | ○ | ○ | Δ |
| Tone, luster | ○ | ○ | ○ | ○ | Δ | Δ | □ |
| Durability | | | | | | | |
| Impact test (hitting by club head) | ○ | ○ | ○ | ○ | ○ | ○ | Δ |
| Sand abrasion test | ○ | ○ | ○ | ○ | ○ | ○ | X |
| Sand/water abrasion test | ○ | ○ | ○ | ○ | ○ | ○ | X |

As clearly understood from Table 2, the transferred marks printed by using transfer printing films of Examples, in comparison with those printed by using conventional films of Comparative Examples, had an equal transferability and far improved in respect of brilliance and luster, preserving a satisfactory durability.

There has been described a golf ball having a transferred mark applied with the ink containing particles of specific metal in specific amount. The mark has a metallic luster, and possesses a novel tone and appearance, thereby the golf ball of the present invention would be a commercial product well agreeable to the diversified golf ball market needs.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising; a cover, a transfer printed pattern in reverse on said cover, said pattern having an ink layer containing pigment and dispersion of flattened metal particles, an average diameter of metal particles in said dispersion being in the range of 10 to 50 microns and an average thickness of said metal particles being in the range of to 50 to 500 angstroms.

2. A golf ball as set forth in claim 1, wherein the ink composition contains 1 to 5 parts by weight of pigment and 20 to 35 parts by weight of dispersion of the metal particles.

3. A golf ball as set forth in claim 1, wherein a content of the metal particles in the dispersion is 5 to 15%.

4. A golf ball as set forth in claim 1, wherein an average diameter of the flattened metal particles is 10 to 60 microns.

5. A golf ball as set forth in claim 1, wherein the metal particle has been embossed on the flattened surface thereof.

6. A golf ball as set forth in claim 1 wherein the metal particles are a mixture of more than two kinds of particles having different average diameter from each other.

7. A golf ball as set forth in claim 1 wherein the metal of the particle is at least one of aluminum, chromium, cobalt, steel, silver, gold and nickel alloy.

* * * * *